United States Patent Office 3,394,901
Patented July 30, 1968

3,394,901
AUTOMATIC LATCHING MECHANISM AND FILM GUIDE ARM FOR A CARTRIDGE-LOADED MOTION PICTURE PROJECTOR
Leslie J. Bunting, Rochester, N.Y., assignor to Eastman Kodak Company, Rochester, N.Y., a corporation of New Jersey
Continuation of application Ser. No. 591,314, Nov. 1, 1966. This application Nov. 7, 1967, Ser. No. 681,295
11 Claims. (Cl. 242—71.1)

ABSTRACT OF THE DISCLOSURE

A latching mechanism for releasably latching a cartridge to an apparatus such as a motion picture projector. The mechanism latches the cartridge to the projector automatically as the cartridge is inserted into position on the projector. A film guide arm also may be automatically positioned by the mechanism upon such insertion. Easy release of the cartridge is accomplished by cooperating cams on latching arms of the mechanism, which cams cause release by all of the latching arms in response to release by one of said arms.

---

Figure 1:
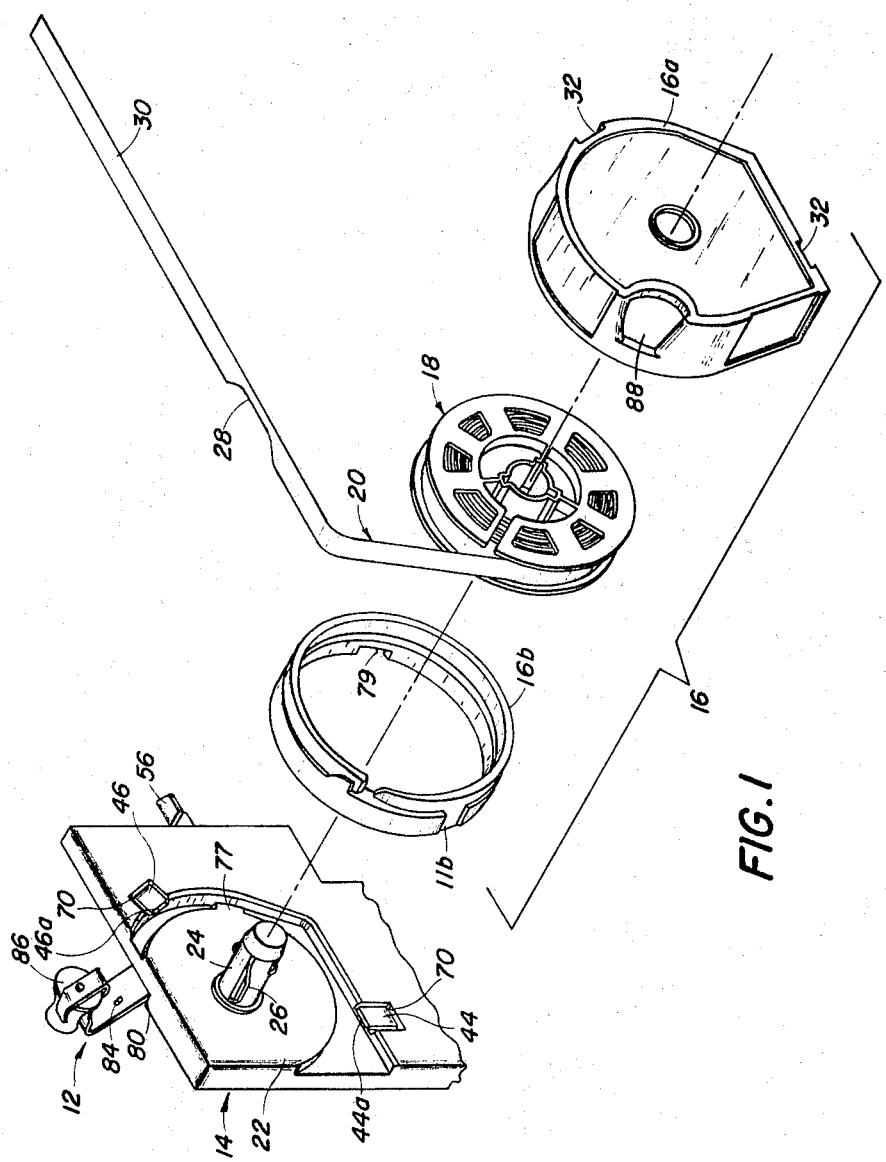

This application is a continuation of Ser. No. 591,314, now abandoned, filed Nov. 1, 1966.

The present invention is directed to an automatic latching mechanism on an apparatus for easy attachment and release of a cartridge that is to be used with the apparatus, and preferably is directed to an automatic latching mechanism for use on a motion picture projector so that a cartridge containing strip material may be readily attached to and released from the motion picture projector.

The present invention is further directed to a film guide arm that is automatically positioned on the motion picture projector from the stored or inoperative position of the guide arm to its operating position when the automatic latching mechanism is actuated.

In a co-pending U.S. application Ser. No. 591,248, entitled, Rim Trap for Photographic Film Projection Cartridge, filed Nov. 1, 1966, by Robert J. Roman, is disclosed a cartridge for projecting a reel of strip material in a motion picture film projector whereby in order to facilitate setting up the projector for operation the cartridge is provided with an arrangement by which the film leader is trapped in the outer periphery of the cartridge each time the film is rewound in the cartridge. This arrangement thus enables the projectionist to readily grasp the film leader through a finger opening in the cartridge and remove the film leader from the cartridge for insertion in the automatic threading mechanism of the projector.

Accordingly, one of the objects of the present invention is to further facilitate the operation of setting up the projector by providing on the cartridge chamfered latching surfaces and by providing on the projector an automatic latching mechanism for latch engagement with the chamfered latching surfaces to readily attach the cartridge to the projector and release the cartridge from the projector.

The motion picture projector that I contemplate using may be one that is suitable for use with conventional film supply reels of different sizes as well as being suitable for receiving the cartridge discussed in this application and in the above-mentioned co-pending application. The motion picture projector may be similar to the one disclosed in co-pending U.S. application Ser. No. 397,451, entitled Automatic Rewinding Mechanism for Film or the Like, filed Sept. 18, 1964, by Robert J. Roman, now Patent No. 3,300,155. In the Roman application relating to the rim trap arrangement on the cartridge, the film guide arm is disclosed as being vertically disposed in a predetermined operative position on the projector relative to the finger opening in the cartridge to serve certain purposes more fully described in that application. Since the film guide arm or idler arm and idler, as described in that application, is not used when a conventional film supply reel is to be used on the projector, the film guide arm must be removed from the path of the reel. Accordingly, another object of the present invention is to provide on the motion picture projector a film guide arm that is to be used with the cartridge when the cartridge is loaded on the projector and to arrange the film guide arm so that it is movable automatically from an inoperative position to an operative position when the automatic latching mechanism is actuated by the cartridge being loaded on the projector.

Other objects of the invention will become apparent to those skilled in the art to which this invention pertains from the drawings and the description that follows.

Figure 2:
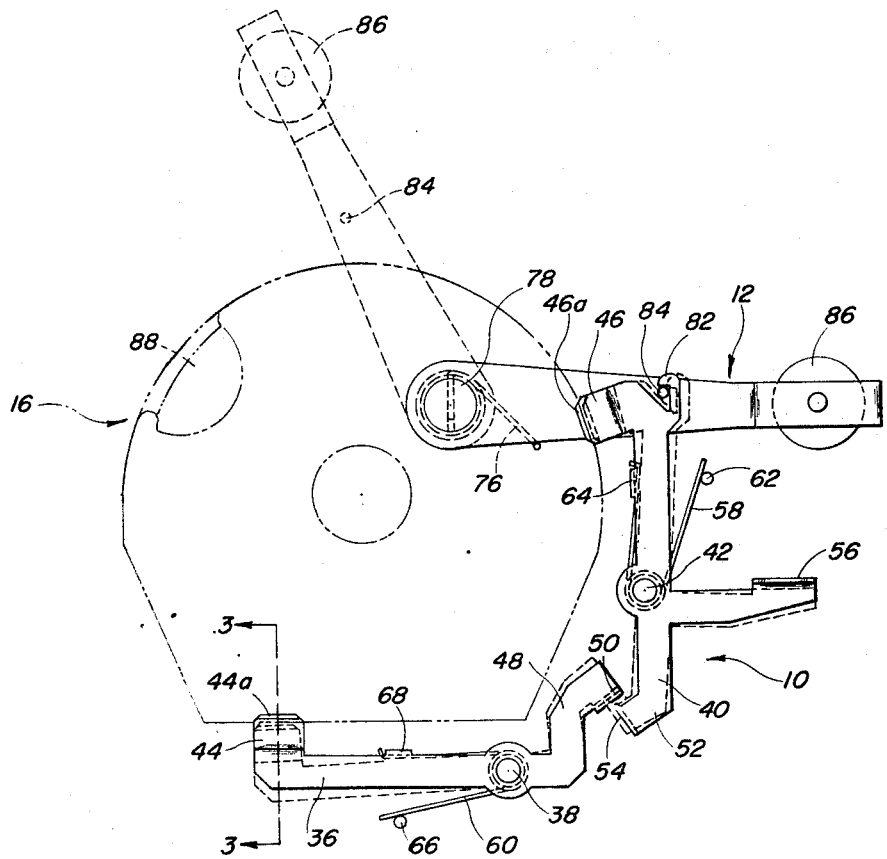
Figure 3:
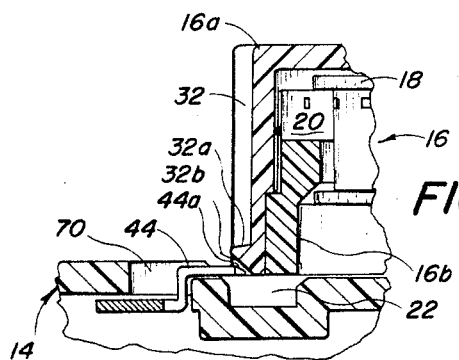
Figure 4:
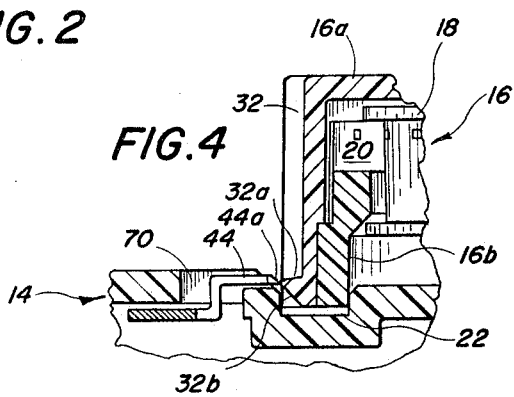
Figure 5:
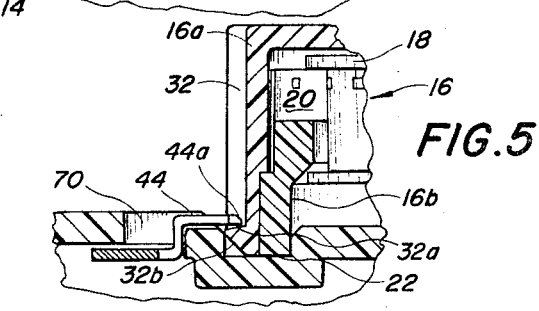

In the drawings:

In FIG. 1 is shown a perspective exploded view of parts of the projection cartridge, of a supply reel of film and illustrating a slot in an edge of the film leader extending from the reel, and of that portion of a film projector adapted to receive the cartridge;

In FIG. 2 is shown a view in elevation of the cartridge, automatic latching mechanism and its release arm and the film guide arm, and illustrating the automatic latching mechanism in solid lines in latched engagement with the cartridge and unlatched position in phantom lines, the film guide arm in the inoperative position in solid lines and in the operative position in phantom lines, and the cartridge in phantom lines;

In FIG. 3 is shown a fragmentary view of the automatic latching mechanism taken along line 3—3 of FIG. 2 and illustrating portions of the film-loaded cartridge, one of the chamfered latching surfaces on the cartridge, and the projector as the cartridge is about to be loaded on the projector;

In FIG. 4 is shown a view similar to FIG. 3 and illustrating the engagement of the chamfered surface with the automatic latching mechanism as the cartridge is being moved toward seated position on the projector; and In FIG. 5 is shown a view similar to FIGS. 3 and 4 and illustrating the latched position of the automatic latching mechanism after the cartridge is in seated position on the projector.

The automatic latching mechanism of this invention constitutes an improvement over the prior art and is designed to readily attach a cartridge in loaded position on a projector and to readily release the cartridge from the projector.

The arrangement by which the film guide arm of this invention is readily released for movement from an inoperative to an operative position by the actuation of the automatic latching mechanism also constitutes an improvement over the prior art.

In reference to the drawings, the automatic latching mechanism is indicated generally at 10 in FIG. 2, the film guide or idler arm at 12, the motion picture film projector at 14, the projection cartridge at 16, the film supply reel at 18, and the film at 20.

Only the pertinent portions of a motion picture film projector necessary to an understanding of the invention are shown since those portions not shown would be conventional. Thus, in FIG. 1 the projector 14 is provided with a recessed support plate 22 for receipt of the projection cartridge; a supply spindle 24 for rotatably receiving the film supply reel 18 in the cartridge; and a drive member (not shown) which rewinds the reel by means of the engagement of the spring member 26 on the spindle with the reel. The manner in which the drive member operates is more fully described in the above-mentioned Roman U.S. application Ser. No. 397,451. The construction and operation of the supply spindle 24 and its spring member 26 are more fully described in my co-pending U.S. application Ser. No. 591,315, entitled Spindle for Supporting Reels or Spools for Rotation, filed Nov. 1, 1966.

In FIG. 1 the projection cartridge is shown in two separate parts: 16a for the outer casing and 16b for the inner cartridge piece. Both inner cartridge and outer casing are preferably formed from a suitable plastic, and the inner cartridge piece is designed to fit within the outer casing in proper oriented position. The outer casing may be provided with a key (not shown) which fits within a keyway 11b in the inner cartridge piece to facilitate the orientation of one part to the other. An additional key 77 may be provided on the recessed plate 22 of the projector for fitting within a keyway 79 provided on the inner cartridge piece 16b so as to ensure proper orientation of the cartridge to the projector when the cartridge is loaded on the projector. The film supply reel 18 snap-fits within the cartridge when the two parts 16a and 16b are in assembled relation, as more fully described in co-pending U.S. application Ser. No. 591,249, entitled Projection Cartridge, filed Nov. 1, 1966, by Robert J. Roman. All other details mentioned in this paragraph including the film 20 and the purpose of the slot 28 in the film leader 30 are more fully described in the abovementioned Roman application on the rim trap arrangement.

The cartridge 16 is provided on the outside periphery with two recessed surfaces 32, each recessed surface being terminated at one edge of the cartridge, respectively, by an abutting surface 32a, and by a chamfer 32b. Each set of these surfaces, 32, 32a and 32b, will henceforth be described as a "chamfered latching surface."

Automatic latching mechanism

The automatic latching mechanism 10 includes lever 36 pivotally mounted on stud 38 and lever 40 pivotally mounted on stud 42. Lever 36 has an offset arm 44 which constitutes a latch end with a beveled surface 44a for cooperating with the chamfered latching surface located at the bottom of the cartridge when looking at FIG. 2. Lever 40 has an offset arm 46 with a beveled surface 46a which constitutes a latch end for cooperating with the other chamfered latching surface located at the upper right hand side of the cartridge, also when looking at FIG. 2.

Lever 36 has a second arm 48 at the opposite end from the offset arm 44 which is provided with a tab 50, and lever 40 has a second arm 52 at the opposite end from the offset arm 46 which is provided with a tab 54, both tabs serving a purpose to be described.

Lever 40 further has a release arm 56 which may be operated to move lever 40 against the bias of its spring 58 to a position for releasing the cartridge from the projector. When lever 40 is moved against its spring-bias, its tab 54 is moved into engagement with tab 50 on lever 36 causing lever 36 to be moved against the bias of its spring 60 to a position also for releasing the cartridge from the projector. Each of the springs 58 and 60, are torsion springs which fit respectively over the studs 42, 38. One of the arms of spring 58 abuts against pin 62 on the projector and the other arm abuts a tab 64 on the lever 40. Spring 60 has one arm abutting against a pin 66 on the projector and another arm abutting a tab 68 on the lever 36.

Operation of automatic latching mechanism

In reference particularly to FIGS. 3, 4 and 5, as the cartridge is moved toward seated position on the recessed support plate 22 of the projector, the chamfers 32b are brought into engagement, respectively, with the beveled surfaced latch ends of offset arms 44, 46 and thereby causing the offset arms to be cammed laterally, as viewed from these figures, respectively within the recessed surfaces 70 on the support plate 22 of the projector. This lateral movement, of course, causes each of the levers 36, 40 to be moved about their pivots against the bias of their springs 60, 58. When the cartridge reaches seated position, as shown in FIG. 5, the latch ends of offset arms 44, 46 return to their normal spring-biased position in latched engagement with the cartridge with the latch ends each being in positive engagement, respectively, against an abutting surface 32a on the cartridge.

One advantage in individually springing each lever 36, 40 is to assure positive latching even if the cartridge is not inserted so as to cause simultaneous latch engagement of both latch ends with the cartridge.

Release of the cartridge is accomplished by manually pressing down on the release arm 56 of the lever 40. This manual force causes the lever 40 to rotate about its pivot 42 against its spring-bias. After a partial rotation the tab 54 will travel through the gap between the respective tabs until the tab 54 contacts tab 50 on lever 36, thus causing lever 36 also to rotate about its pivot 38 against its spring-bias as force continues to be exerted on release arm 56. In this manner the latch ends of the levers are caused to move laterally or to retract within the recessed surfaces 70 on the projector support plate 22, thus permitting manual removal of the cartridge from the support plate.

Film guide arm

The automatic latching mechanism may, when actuated, also serve to release the film guide arm 12 from its inoperative position, shown in solid lines in FIG. 2, so that the film guide arm may be rotated by its torsion spring 76 about its pivot 78 counterclockwise to operative position, shown in phantom lines in FIG. 2. The counterclockwise rotation continues until the film guide arm meets the stop surface 80 (FIG. 1) on the projector.

In order to accomplish the release of the film guide arm to its operative position, a hook 82 is provided adjacent the latch and on lever 40. A pin 84 is provided on the film guide arm, and the hook 82 so engages the pin 84 when the film guide arm is moved to its inoperative position as to retain the film guide arm in the inoperative position. A small rotation of the lever 40, caused either by inserting a cartridge as described above, or by applying a downward pressure on the release arm 56 will cause the hook to move out of retaining engagement with the pin 84 and thus release the film guide arm for movement to operative position. The film guide arm may be manually moved to its inoperative position when the projector is to be used with a conventional film supply reel.

The film guide or idler arm is provided with a roller or idler 86 and the purpose of this arrangement, as mentioned above, is more fully described in a co-pending application, as well as in my co-pending U.S. application Ser. No. 591,153, entitled Film Guide Edges on Projection Cartridge, filed Nov. 1, 1966. The latter application shows the cooperation of the idler arm and idler with the finger opening 88 in the edge of the cartridge (FIGS. 1 and 2).

Although the apparatus on which the automatic latching mechanism operates is described as a motion picture film projector, it will be readily recognized that the latching mechanism could be used on any other type of apparatus that is designed to receive a cartridge. Similarly, the film guide arm would also be suitable for operating on other apparatus involving the use and guidance of strip materials.

Although the foregoing description relates to specific embodiments of the invention, it is obvious that variations and modifications can be effected within the spirit and scope of the invention. Accordingly, the present disclosure is to be considered as illustrative and not as limiting the scope of the invention which is defined by the following claims.

I claim:
1. A latching mechanism, for releasably latching a film cartridge to a film projector, comprising:
   first and second independently movable latching arms independently mounted on the projector, each of said first and second arms being movable between a latching location and a releasing location;
   means for biasing each of said first and second arms toward its latching location; and
   cooperating means on said arms for moving said second arm toward its releasing location in response to movement of said first arm toward its releasing location.

2. In combination with a film projector, and a film cartridge having first and second latching surfaces each including a chamferred portion, a latching mechanism comprising:
   first and second movably mounted latching levers adapted to cooperate with the first and second latching surfaces, respectively, each of said first and second levers being movable in a direction to engage the corresponding latching surface to latch the cartridge to the projector, and being movable in a direction to disengage the corresponding latching surface to release the cartridge from the projector; and,
   means for biasing each of said levers toward engagement with the corresponding latching surface; each of said levers having an offset end including a beveled portion adapted to be engaged by the chamferred portion of the corresponding latching surface to effect latching engagement of each of said levers with the corresponding latching surface when a cartridge is positioned on the projector; and
   cooperating means on said levers for moving said second lever in a direction to disengage its corresponding latching surface in response to movement of said first lever in a direction to disengage its corresponding latching surface.

3. An automatic latching mechanism adapted to be mounted on a motion picture projector for latching to said projector and releasing from said projector a film-loaded cartidge having at least two latching surfaces, and comprising:
   first and second movable levers;
   means for individually biasing said first and second levers toward latching positions in engagement with the latching surfaces respectively of the cartridge;
   means for moving said first lever from said latching position; and
   cooperating abutment means on each of said first and second levers for moving said second lever from its latching position in response to movement of said first lever from its latching position to thereby release the cartridge.

4. An automatic latching mechanism, adapted to be mounted on an apparatus for latching to the apparatus and releasing from the apparatus a strip-loaded cartridge having latching surfaces, comprising:
   first and second levers independently movable in directions to engage the latching surfaces of the cartridge for latching the cartridge to the projector, said first and second levers also being movable in directions to release the cartridge from the projector;
   means for biasing each of said first and second levers in said latching directions; and
   abutment means on each of said levers for moving one of said levers in a releasing direction in response to movement of the other of said levers in a releasing direction.

5. An automatic latching mechanism on an apparatus for latching to said apparatus and releasing from said apparatus a strip-loaded cartridge having latching surfaces, and comprising:
   first and second movably mounted levers each being individually spring-biased to a latching position and adapted to engage said latching surfaces on a cartridge and being movable to a releasing position adapted to release said cartridge from said apparatus; and
   mutually cooperating means on each of said first and second levers, for moving one of said levers toward said releasing position in response to movement of the other lever toward its releasing position.

6. An automatic latching mechanism as defined in claim 5, wherein each of said mounted levers has an offset arm for engaging a latching surface on said cartridge.

7. An automatic latching mechanism as defined in claim 5, wherein said means on said first and second levers each constitute a tab on an arm offset at one end of each of said levers.

8. An automatic latching mechanism as defined in claim 5, wherein said first lever has a release arm against which force can be exerted to move said first lever against its spring-bias to said releasing position.

9. An automatic lacthing mechanism as defined in claim 5, wherein said levers are movably mounted on pivots.

10. An automatic latching mechanism as defined in claim 5, and including a spring-biased film guide arm movable from an inoperative position to an operative position in predetermined vertical relationship to said cartridge, and wherein said latching mechanism and said film guide arm have cooperating means for retaining said film guide arm in its inoperative position against its spring-bias.

11. An automatic latching mechanism as defined in claim 5, and including a spring-biased film guide arm movable from an inoperative position to an operative position in predetermined vertical relationship to said cartridge, and wherein said latching mechanism has a hook and said film guide arm has a pin with the hook being adapted to retainingly engage said pin for retaining said film guide arm in its inoperative position against its spring-bias.

References Cited

UNITED STATES PATENTS

| | | | |
|---|---|---|---|
| 1,451,842 | 4/1923 | Pittman | 242—71.1 |
| 1,998,324 | 4/1935 | Lloyd | 242—71.1 X |

FRANK J. COHEN, *Primary Examiner.*

NATHAN L. MINTZ, *Assistant Examiner.*